(12) United States Patent
Tatewaki et al.

(10) Patent No.: US 12,352,676 B2
(45) Date of Patent: Jul. 8, 2025

(54) PARTICLE GROUP CHARACTERISTIC MEASUREMENT DEVICE, PARTICLE GROUP CHARACTERISTIC MEASUREMENT METHOD, STORAGE MEDIUM RECORDING PROGRAM FOR PARTICLE GROUP CHARACTERISTIC MEASUREMENT DEVICE, PARTICLE DIAMETER DISTRIBUTION MEASUREMENT DEVICE, AND PARTICLE DIAMETER DISTRIBUTION MEASUREMENT METHOD

(71) Applicant: HORIBA, Ltd., Kyoto (JP)

(72) Inventors: Yasuhiro Tatewaki, Kyoto (JP); Shingo Fujiwara, Kyoto (JP)

(73) Assignee: HORIBA, LTD., Kyoto (JP)

( * ) Notice: Subject to any disclaimer, the term of this patent is extended or adjusted under 35 U.S.C. 154(b) by 0 days.

(21) Appl. No.: 17/754,831

(22) PCT Filed: Oct. 6, 2020

(86) PCT No.: PCT/JP2020/037815
§ 371 (c)(1),
(2) Date: Apr. 13, 2022

(87) PCT Pub. No.: WO2021/075309
PCT Pub. Date: Apr. 22, 2021

(65) Prior Publication Data
US 2024/0102907 A1    Mar. 28, 2024

(30) Foreign Application Priority Data
Oct. 15, 2019  (JP) ................................ 2019-188443

(51) Int. Cl.
*G01N 15/0227* (2024.01)
*G01N 15/0205* (2024.01)
*G01N 15/00* (2006.01)

(52) U.S. Cl.
CPC ..... *G01N 15/0227* (2013.01); *G01N 15/0211* (2013.01); *G01N 2015/0053* (2013.01)

(58) Field of Classification Search
CPC ........... G01N 15/0227; G01N 15/0211; G01N 2015/0053; G01N 15/1433;
(Continued)

(56) References Cited

U.S. PATENT DOCUMENTS

| | | | |
|---|---|---|---|
| 10,943,692 B1 * | 3/2021 | Lynn | A61B 5/0022 |
| 2004/0184649 A1 * | 9/2004 | Canty | G01N 15/1433 382/110 |

(Continued)

FOREIGN PATENT DOCUMENTS

| | | | | |
|---|---|---|---|---|
| CN | 105571998 A | 5/2016 | | |
| CN | 103575734 B * | 6/2016 | ............. | G01N 21/84 |

(Continued)

OTHER PUBLICATIONS

PCT, International Search Report for the corresponding application No. PCT/JP2020/037815, dated Dec. 22, 2020, with English translation.

(Continued)

*Primary Examiner* — Mohamed K Amara
(74) *Attorney, Agent, or Firm* — LUCAS & MERCANTI, LLP

(57) ABSTRACT

A particle group characteristic measurement device includes an image acquisition portion that acquires images of a particle group, a particle information extraction portion that processes acquisition images acquired by the image acquisition portion, and then extracts particle information which (Continued)

is information about particles appearing in the acquisition images, and a particle group characteristic calculation portion that calculates a particle group characteristic at a plurality of time points in a time series based on the particle information extracted from a plurality of the acquisition images acquired prior to respective time points. The particle group characteristic calculation portion calculates the particle group characteristic at each time point based on the plurality of acquisition images used to calculate the particle group characteristic at time points previous to that time point, and on the particle information extracted from the plurality of acquisition images whose image acquisition time periods partially overlap each other.

13 Claims, 9 Drawing Sheets

(58) Field of Classification Search
CPC .......... G01N 15/1429; G01N 15/1434; G01N 15/1459; G01N 15/01; G01N 15/1484; G01N 2015/003; G01N 2015/1445; G01N 2015/1454; G01N 2015/1493; G01N 2015/1497; G02B 21/0056; G02B 21/0068; G02B 21/008; G03H 1/0005; G03H 2001/005
See application file for complete search history.

(56) References Cited

U.S. PATENT DOCUMENTS

| | | | | |
|---|---|---|---|---|
| 2012/0135535 A1* | 5/2012 | Grier | .................. | G01N 15/1459 436/164 |
| 2013/0330666 A1* | 12/2013 | Fukuri | ............... | G03G 9/09364 430/137.14 |
| 2014/0368378 A1* | 12/2014 | Crain | ..................... | H01Q 15/14 342/25 A |
| 2018/0056689 A1* | 3/2018 | Makuta | ................ | C09D 11/322 |
| 2018/0257104 A1* | 9/2018 | Che | ......................... | B05D 7/04 |
| 2021/0190660 A1* | 6/2021 | Stahl | .................. | G01N 15/0227 |
| 2024/0102907 A1* | 3/2024 | Tatewaki | .......... | G01N 15/1459 |

FOREIGN PATENT DOCUMENTS

| | | | | | |
|---|---|---|---|---|---|
| CN | 107316301 | A | | 11/2017 | |
| JP | H04-36637 | A | | 2/1992 | |
| JP | H06-277687 | A | | 10/1994 | |
| JP | 2000-146817 | A | | 5/2000 | |
| JP | 2001056282 | A | | 2/2001 | |
| JP | 2001074637 | A | * | 3/2001 | ............. G01N 15/02 |
| JP | 2002-207001 | A | | 7/2002 | |
| JP | 3411112 | B2 | * | 5/2003 | ......... G01N 15/0227 |
| JP | 2008-249724 | A | | 10/2008 | |
| JP | 2013-015357 | A | | 1/2013 | |
| JP | 2015-105898 | A | | 6/2015 | |
| JP | 2015-520397 | A | | 7/2015 | |
| JP | 2017-116260 | A | | 6/2017 | |
| JP | 2020504296 | A | * | 2/2020 | ............. G01N 15/02 |
| JP | 7172212 | B2 | * | 11/2022 | ......... G01N 15/1434 |
| WO | WO-2008131409 | A1 | * | 10/2008 | ......... G01N 15/0227 |
| WO | 2013/190327 | A2 | | 12/2013 | |
| WO | WO-2022247945 | A1 | * | 12/2022 | ............. G01N 15/06 |

OTHER PUBLICATIONS

Decision to Grant a Patent, dated Nov. 14, 2024, which was issued for the corresponding Japanese Patent Application No. 2021-552335, 5 pages, with English Translation.

Office Action dated Sep. 13, 2024, issued in related Chinese patent application No. 202080071290.2, with English translation, 28 pages.

* cited by examiner

PARTICLE GROUP CHARACTERISTIC MEASUREMENT DEVICE, PARTICLE GROUP CHARACTERISTIC MEASUREMENT METHOD, STORAGE MEDIUM RECORDING PROGRAM FOR PARTICLE GROUP CHARACTERISTIC MEASUREMENT DEVICE, PARTICLE DIAMETER DISTRIBUTION MEASUREMENT DEVICE, AND PARTICLE DIAMETER DISTRIBUTION MEASUREMENT METHOD

CROSS REFERENCE TO RELATED APPLICATION

This Application is a 371 of PCT/JP2020/037815 filed on Oct. 6, 2020, which, in turn, claimed the priority of Japanese Patent Application No. 2019-188443 filed on Oct. 15, 2019, and both applications are incorporated herein by reference.

TECHNICAL FIELD

The present invention relates to a particle group characteristic measurement device that measures changes over time in a characteristic of a particle group (this may be referred to below as a particle group characteristic) that is formed by a plurality of particles dispersed in a dispersion medium, and to a particle group characteristic measurement method, a storage medium recording program for a particle group characteristic measurement device, a particle diameter distribution measurement device, and a particle diameter distribution measurement method.

TECHNICAL BACKGROUND

It is known that the state of a particle group that is dispersed in a dispersion medium changes over time due to the dispersion and flocculation and the like of the particles. For this reason, when, for example, the particle diameter distribution and the like of a particle group is being measured, it is desirable that changes over time in a particle group characteristic such as, for example, a representative particle diameter or the like of the particle group be measured in advance, and that the state of the particle group then be monitored and the measurement of the particle diameter distribution be performed after the particle group has attained a desired state.

Conventionally, in order to measure the changes over time in this type of particle group characteristic, a laser diffraction and scattering type of measurement device is used that detects a light intensity of diffraction light and scattered light that are generated when laser light is irradiated onto a particle group (Patent Document 1). However, in this laser diffraction and scattering system, because of the problem of laser stability, it is necessary to make a blank measurement prior to performing the actual measurement. Because of this, the problem arises that it is difficult to measure changes over time in a particle group characteristic over a prolonged period.

To counter this, a method may be considered in which changes over time in a particle group characteristic are measured using a device of what is known as an image analysis system that processes an acquisition image obtained by irradiating light onto a particle group and then acquiring an image of this particle group, and then, for example, extracts information about the particles (this may be referred to below as particle information) appearing in the acquisition image so as to calculate a particle group characteristic such as the representative particle diameter or the like. Because a blank measurement is not required if a device of this image analysis system is used, it is possible to measure changes over time in a particle group characteristic over a prolonged period.

DOCUMENTS OF THE PRIOR ART

Patent Documents

[Patent Document 1] Japanese Unexamined Patent Application (JP-A) No. 2002-207001

DISCLOSURE OF THE INVENTION

Problems to be Solved by the Invention

However, in a case in which an image analysis system device is used, it is necessary to lower the density of particles in the sample in order to secure a sufficient quantity of transmission light from the sample obtained from the image acquisition. Because of this, there is a reduction in the number of particles appearing in a single acquisition image. Therefore, in a conventional image analysis system device that processes a single acquisition image and calculates a particle group characteristic based on particle information such as the particle diameter or the like as it appears in this acquisition image, there is an increase in statistical errors contained in the calculated particle group characteristic. To solve this problem, a method may be considered in which each time the number of acquisition images necessary to reduce the statistical errors to a permitted range is attained, the particle group characteristic is calculated using this plurality of acquisition images. However, in this method, because an extended length of time is required to attain the necessary number of acquisition images, the interval between particle group characteristic updates increases, and the problem arises that it is difficult to ascertain changes over time in a particle group characteristic.

The present invention was conceived in view of the above-described problem, and it is a principal object thereof to provide a particle group characteristic measurement device that measures changes over time in a particle group characteristic based on acquisition images, and enables statistical errors contained in a calculated particle group characteristic to be reduced, and makes it easier to ascertain changes over time in the particle group characteristic.

Means for Solving the Problem

Namely, a particle group characteristic measurement device according to the present invention measures changes over time in a particle group characteristic which is a characteristic of a particle group that is formed by a plurality of particles dispersed in a dispersion medium, and includes an image acquisition portion that acquires images of the particle group, a particle information extraction portion that processes the acquisition images acquired by the image acquisition portion, and then extracts particle information which is information about the particles appearing in the acquisition images, and a particle group characteristic calculation portion that calculates the particle group characteristic at a plurality of time points in a time series based on the particle information extracted from a plurality of the acquisition images acquired prior to the respective time points, wherein the particle group characteristic calculation portion calculates the particle group characteristic at each time point based on the plurality of acquisition images used to calculate the particle group characteristic at time points previous to that time point, and on the particle information extracted from the plurality of acquisition images whose image acquisition time periods partially overlap each other.

If this type of structure is employed, then because a particle group characteristic at each time point is calculated based on particle information extracted from a plurality of acquisition images, compared with a case in which a particle group characteristic is calculated based on particle information extracted from a single acquisition image, the statistical quantity of particle information can be increased, and the number of statistical errors contained in the calculated particle group characteristic can be reduced. Moreover, because a structure is employed in which the particle group characteristic at each time point is calculated based on the plurality of acquisition images used to calculate the particle group characteristic at the time points previous to that time point, and on the particle information extracted from a plurality of acquisition images whose image acquisition time periods partially overlap each other, in other words, because a portion of the plurality of acquisition images used to calculate a particle group characteristic at each time point is made up of acquisition images that have already been obtained up until the time point prior to that time point, it is possible to shorten the time required to secure the number of particle information items that are needed in order to reduce statistical errors to within a permissible range, and it is also possible to calculate the particle group characteristic at each time point within a short space of time. As a consequence, at the same time as statistical errors contained in a calculated particle group characteristic are reduced, it becomes easier to ascertain changes over time in the particle group characteristic.

In this particle group characteristic measurement device, it is preferable that the particle group characteristic calculation portion calculate the particle group characteristic at each time point based on the particle information extracted from the plurality of acquisition images that partially overlap with the plurality of acquisition images used to calculate the particle group characteristic at the time point immediately previous to that time point.

If this type of structure is employed, then because the particle group characteristic at each time point is calculated based on the particle information extracted from the plurality of acquisition images that partially overlap with the plurality of acquisition images used to calculate the particle group characteristic at the time point previous to that time point, in other words, because the particle group characteristic at each time point is calculated while taking into consideration a portion of the particle information used to calculate the particle group characteristic at the time point previous to that time point, it is possible to reduce the amount of changes in the particle group characteristic between mutually adjacent time points. As a consequence, because the amount of change in the particle group characteristic between mutually adjacent time points is reduced, smoothing of the particle group characteristic at each time point is achieved, and it becomes dramatically easier to ascertain any changes over time therein.

In this particle group characteristic measurement device, it is preferable that the particle group characteristic calculation portion calculate the particle group characteristic at each time point based on a plurality of the particle information items that include the particle information extracted immediately previous to that time point.

If this type of structure is employed, then the particle group characteristic calculated at each time point can be made to reflect the most up-to-date state of the particle group at each time point.

Another aspect of the above-described particle group characteristic calculation portion is a structure in which the particle group characteristic calculation portion calculates the particle group characteristic at each time point based on the particle information extracted from a fixed number of the acquisition images that were acquired in a continuous acquisition sequence.

In this particle group characteristic measurement device, it is preferable that there be further provided a calculation command portion that outputs a calculation command signal commanding that the particle group characteristic be calculated to the particle group characteristic calculation portion, and that the calculation command portion output the calculation command signal after predetermined time intervals.

If this type of structure is employed, then because changes in the particle group characteristic can be ascertained at fixed times, the user-friendliness of the device is increased.

In this particle group characteristic measurement device, it is preferable that there be further provided a calculation command portion that outputs a calculation command signal commanding that the particle group characteristic be calculated to the particle group characteristic calculation portion, and that the calculation command portion output the calculation command signal each time the particle information extraction portion extracts the particle information from a predetermined number of the acquisition images.

If this type of structure is employed, then because changes in the particle group can be ascertained for those times when images of the particle group are acquired, the user-friendliness of the device is increased.

In this particle group characteristic measurement device, it is preferable that there be further provided a display control portion that displays in real time results of the calculation made by the particle group characteristic calculation portion at the respective time points.

If this type of structure is employed, then a user is able to verify in real time changes over time in the particle group characteristic.

In this particle group characteristic measurement device, it is preferable that the particle group characteristic calculation portion calculate a mutually different plurality of the particle group characteristics, and that the display control portion display this plurality of particle group characteristics on the same screen.

If this type of structure is employed, then because mutually different types of particle group characteristics are displayed as the particle group characteristics on the same screen, it is possible to ascertain changes over time in the state of a particle group. For example, in a case in which a representative particle diameter $D_{50}$ and a representative aspect ratio are displayed as the plurality of particle group characteristics, if the value of representative particle diameter $D_{50}$ becomes progressively smaller over time, and the value of the aspect ratio becomes progressively larger over time, then it can be ascertained that there is a possibility that the dispersed particles are breaking down or are deforming. The representative particle diameter of the plurality of particles forming the particle group may be held up as an example of a specific aspect of the above-described particle group characteristic.

Moreover, a particle group characteristic measurement method of the present invention is a method of measuring changes over time in a particle group characteristic which is a characteristic of a particle group that is formed by a plurality of particles dispersed in a dispersion medium, and is characterized by including steps of acquiring images of the particle group, processing the acquired acquisition images of the particle group, and extracting particle information which is information about the particles appearing in the acquisition images, and calculating the particle group characteristic at a plurality of time points in a time series based on the particle information extracted from the plurality of acquisition images acquired prior to the respective time points, and is also characterized in that, in the calculation of the particle group characteristic, the particle group characteristic at each time point is calculated based on the plurality of acquisition images used to calculate the particle group characteristic at the time point previous to that time point, and on the particle information extracted from a plurality of the acquisition images whose image acquisition time periods partially overlap each other.

If this type of particle group characteristic measurement method is employed, then the same type of action and effects as those obtained from the above-described particle group characteristic measurement device can be demonstrated.

A storage medium that stores program for a particle group characteristic measurement device of the present invention is a storage medium that stores program for a particle group characteristic measurement device that measures changes over time in a particle group characteristic which is a characteristic of a particle group that is formed by a plurality of particles dispersed in a dispersion medium, and is characterized by causing a computer to perform functions of an image acquisition portion that acquires images of the particle group, a particle information extraction portion that processes an acquisition image acquired by the image acquisition portion, and then extracts particle information which is information about the particles captured in the acquisition image, and a particle group characteristic calculation portion that calculates the particle group characteristic at a plurality of time points in a time series based on the particle information extracted from the plurality of acquisition images acquired prior to the respective time points, and that calculates the particle group characteristic at each time point based on the plurality of acquisition images used to calculate the particle group characteristic at the time points previous to that time point, and on the particle information extracted from the plurality of acquisition images whose image acquisition time periods partially overlap each other.

If this type of storage medium that stores program for a particle group characteristic measurement device is employed, then the same type of action and effects as those obtained from the particle group characteristic measurement device of the present invention can be demonstrated.

A particle diameter distribution measurement device of the present invention is a device that measures a particle diameter distribution of a particle group that is formed by a plurality of particles dispersed in a dispersion medium, and is characterized by including a circulation system that causes a suspension to circulate between a measurement cell and a mixture tank that creates the suspension by mixing the dispersion medium with the particles, an optical measurement system that measures the particle diameter distribution of the particle group based on scattered light that is generated as a result of laser light being irradiated onto the suspension that is flowing through an interior of the measurement cell, and the above-described particle group characteristic measurement device of the present invention that measures changes over time in a characteristic of the particle group in the suspension that is flowing through the circulation system.

If this type of particle diameter distribution measurement device is employed, then because a particle group characteristic in a suspension flowing through a circulation system is monitored by the above-described particle group characteristic measurement device of the present invention, it is easy to ascertain changes over time in a particle group characteristic within the circulation system. Because of this, it is possible to start measuring a particle diameter distribution using an optical measurement system at a more suitable timing compared to when the conventional technology is used.

Moreover, a particle diameter distribution measurement method of the present invention is a method of measuring a particle diameter distribution of a particle group that is formed by a plurality of particles dispersed in a dispersion medium, and is characterized by including causing a suspension to circulate between a measurement cell and a mixture tank that creates the suspension by mixing the dispersion medium with the particles, measuring changes over time in a characteristic of the particle group in the suspension being circulated using the above-described particle group characteristic measurement method of the present invention, and measuring the particle diameter distribution of the particle group based on scattered light that is generated as a result of laser light being irradiated onto the suspension that is flowing through an interior of the measurement cell.

According to this type of particle diameter distribution measurement method, the same type of action and effects as those obtained from the particle diameter distribution measurement device of the present invention can be demonstrated.

Effects of the Invention

According to the present invention which is formed in the manner described above, it is possible to provide a particle group characteristic measurement device that measures changes over time in a particle group characteristic based on acquisition images of the particle group, and it thereby is possible to not only reduce statistical errors contained in a particle group characteristic that is being calculated, but to also easily ascertain any changes over time in that characteristic.

DESCRIPTION OF THE REFERENCE NUMERALS

200 . . . Particle Group Characteristic Measurement Device
21 . . . Image Capture Cell
22 . . . Image Capture Light Source
23 . . . Image Acquisition Portion
24 . . . Second Information Processing Device
241 . . . Particle Information Extraction Portion
242 . . . Storage Portion
243 . . . Particle Group Characteristic Calculation Portion
245 . . . Display Control Portion
25 . . . Display Device

BEST EMBODIMENTS FOR IMPLEMENTING THE INVENTION

Hereinafter, a particle group characteristic measurement device 200 according to an embodiment of the present invention will be described with reference to the drawings. Note that the particle group characteristic measurement device 200 of the present embodiment forms part of a particle diameter distribution measurement device 100 that measures a particle diameter distribution of a particle group that is formed by a plurality of particles dispersed in a dispersion medium. In the following, firstly, a description is given of an overall structure of the particle diameter distribution measurement device 100, and after this description, a structure of the particle group characteristic measurement device 200 is described.

Figure 1:
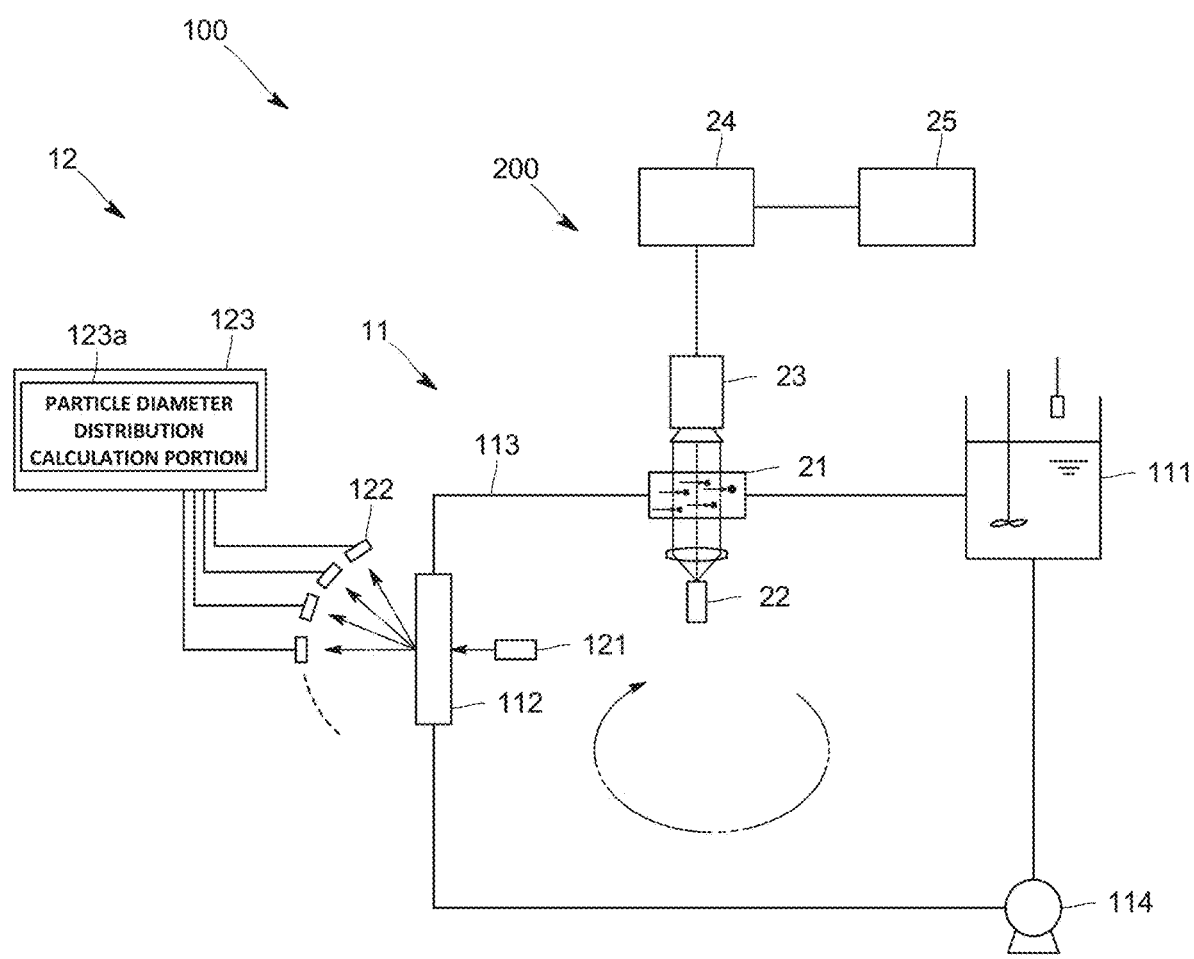
FIG. 1 is a view schematically showing an overall structure of a particle diameter distribution measurement device of the present embodiment.

The particle diameter distribution measurement device 100 measures a particle diameter distribution of a particle group by detecting a light intensity of scattered light that is generated when laser light is irradiated onto the particle group. More specifically, as is shown in FIG. 1, this particle diameter distribution measurement device 100 is formed by a circulation system 11 in which a sample loading tank 111 is connected to a laser diffraction cell 112 via a circulation flow path 113, and that enables a suspension created by dispersing a powder sample in a dispersion medium to circulate, an optical-type (more specifically, a diffraction/scattering-type) measurement system 12 that measures a particle diameter distribution of a particle group based on scattered light that is generated when laser light is irradiated onto the suspension flowing through the interior of the laser diffraction cell 112, and the particle group characteristic measurement device 200 that measures changes over time in a characteristic of a particle group (this may be referred to below as a 'particle group characteristic') in the suspension flowing through the circulation system 11.

The sample loading tank 111 creates a suspension by mixing a powder sample containing a plurality of particles that has been loaded into the sample loading tank 111 into a dispersion medium (for example, pure water or alcohol or the like) that disperses this powder sample. By mixing this powder sample and dispersion medium together, the particles contained in the powder sample are dispersed in the dispersion medium so as to form a particle group.

A centrifugal-type circulation pump 114 that forcibly circulates the suspension is provided in the circulation system 11, and the suspension that has been mixed within the sample loading tank 111 is fed to the laser diffraction cell 112.

The laser diffraction cell 112 is what is known as a flow-type of cell, and is formed so as to enable the suspension that has been introduced from the outside to circulate in a liquid-tight manner between a mutually-facing pair of light-transparent plates, and to then be guided to the outside. Laser light is irradiated in such a way as to travel from one of these light-transparent plates towards the other light-transparent plate.

The optical measurement system 12 is provided with a laser light source 121 that irradiates laser light onto the suspension within the laser diffraction cell 112, a plurality of photodetectors 122 that detect an intensity of the scattered light generated by the irradiation of the laser light in accordance with a scattering angle, and a first information processing device 123 that calculates a particle diameter distribution of the particle group based on light intensity signals output by the plurality of photodetectors 122.

In physical terms, the first information processing device 123 is either a general-purpose or dedicated computer that includes a CPU, memory, and input/output interfaces and the like. As a result of the CPU and the peripheral devices thereof operating in mutual collaboration in accordance with a predetermined program that is stored in a predetermined area of the memory, the first information processing device 123 functions as a particle diameter distribution calculation portion 123*a*.

The particle diameter distribution calculation portion 123*a* calculates the particle diameter distribution of the particle group in the suspension based on the light intensity signals output from the plurality of photodetectors 122. More specifically, based on a scattering pattern that is formed by the scattering angle and by the intensity of the scattered light at that scattering angle that are shown by the light intensity signals output from the plurality of photodetectors 122, and on a predetermined logical operation formula that is derived from Mie scattering theory, Rayleigh scattering theory, or Fraunhofer diffraction theory and the like, the particle diameter distribution calculation portion 123*a* calculates a particle diameter distribution that corresponds to this scattering pattern.

The particle group characteristic measurement device 200 measures changes over time in a particle group characteristic by processing acquisition images obtained by acquiring consecutive images of a particle group in the suspension. More specifically, this particle group characteristic measurement device 200 is provided with an image capture cell 21 through whose interior the suspension is circulated, an image capture light source 22 that irradiates light onto the suspension within the image capture cell 21, an image acquisition portion 23 that acquires images of the suspension within the image capture cell 21, a second information processing device 24 that calculates the particle group characteristic by processing the acquisition images acquired by the image acquisition portion 23, and a display device 25 that displays results of calculations performed by the second information processing device 24.

The image capture cell 21 is what is known as a flow-type of cell, and is formed so as to enable the suspension that has been introduced from the outside to circulate between a pair of mutually-facing light-transparent plates, and then guided to the outside. Light is irradiated in such a way as to travel from one of these light-transparent plates towards the other light-transparent plate.

The image capture light source 22 irradiates parallel light onto the suspension within the image capture cell 21, and is provided with an LED device such as, for example, a white LED or the like, and with a condensing mechanism such as a lens or the like that condenses the light emitted from the LED device so that this light becomes parallel light.

Figure 2:
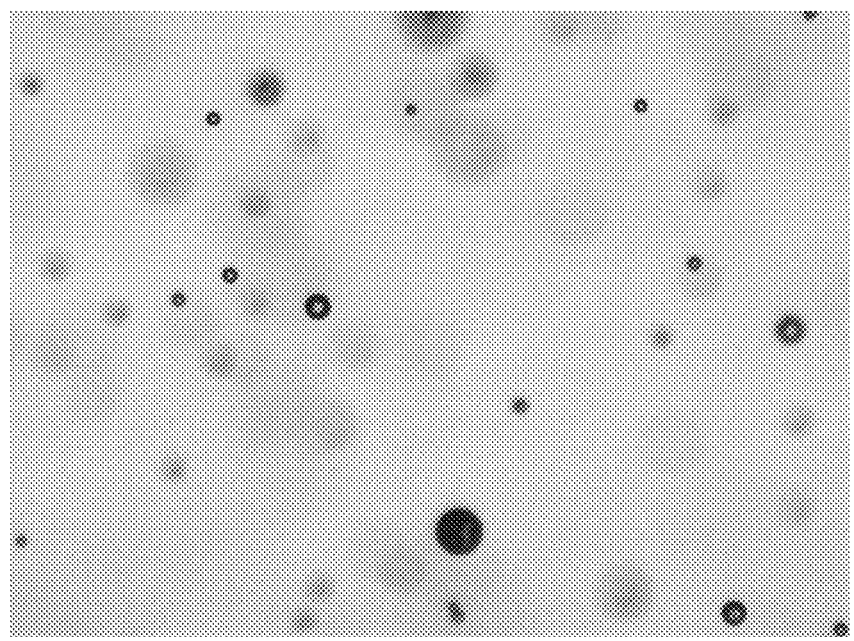
FIG. 2 is a view showing an example of an acquisition image acquired by an image acquisition portion of the same embodiment.

The image acquisition portion 23 acquires consecutive images of the particle group in the suspension flowing through the image capture cell 21, and sequentially outputs acquisition image data showing these acquisition images (see FIG. 2) to the second information processing device 24. More specifically, the image acquisition portion 23 is provided with image acquisition elements such as either color or monochrome CCD or CMOS image sensors or the like.

The image acquisition portion 23 of the present embodiment is formed so as to receive an image acquisition command signal from the second information processing device 24 commanding that it acquire an image. This command then acts as a trigger for the image acquisition portion 23 to acquire an image of the particle group in the suspension. Here, the image acquisition portion 23 is formed in such a way that each time it receives this image acquisition command signal, the image acquisition portion 23 acquires a single image of the particle group in the suspension, and then outputs this image.

Figure 3:
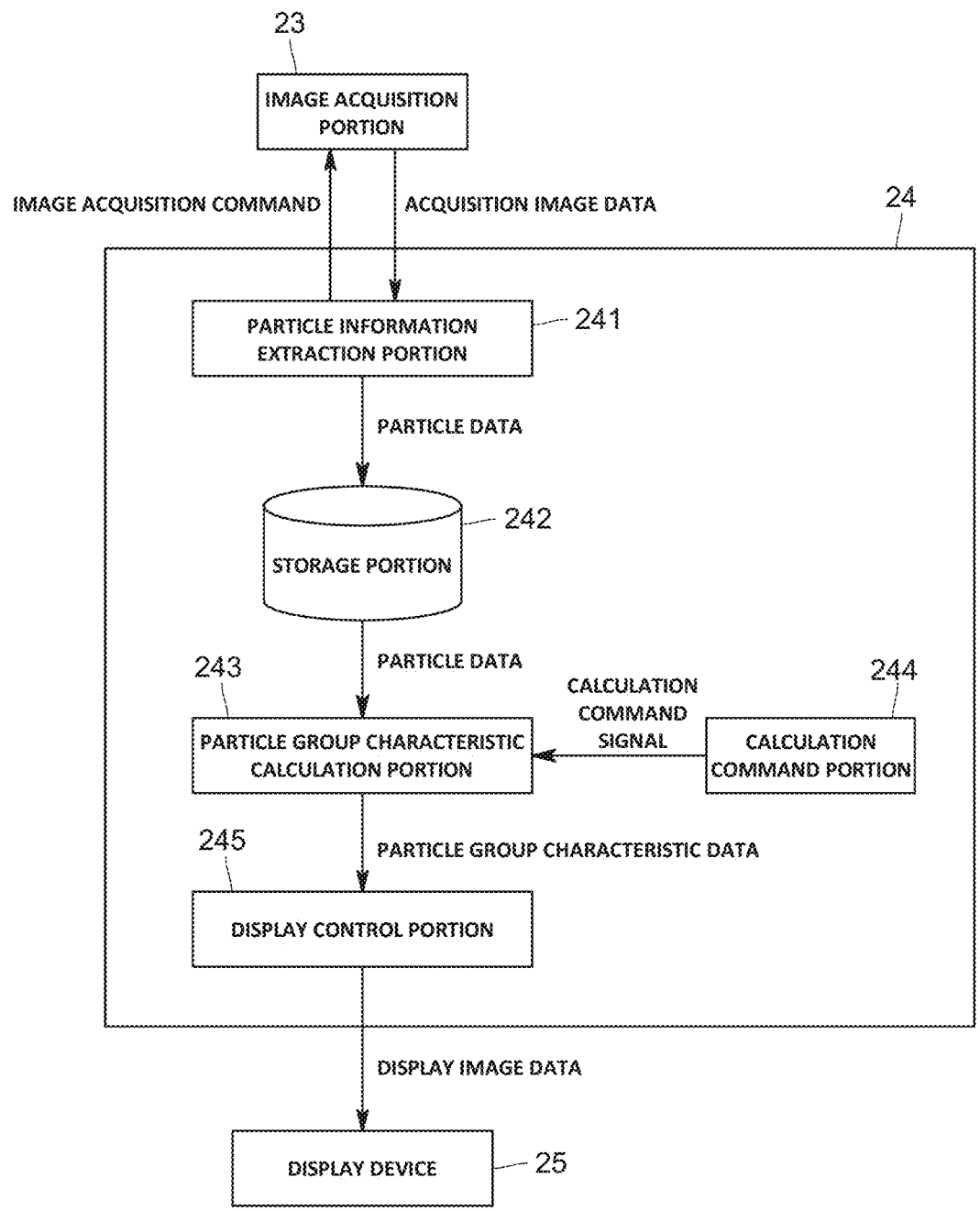
FIG. 3 is a function block diagram of a particle group characteristic measurement device of the same embodiment.

In physical terms, the second information processing device 24 is either a general-purpose or dedicated computer that includes a CPU, memory, and input/output interfaces and the like. As a result of the CPU and the peripheral devices thereof operating in mutual collaboration in accordance with a predetermined program that is stored in a predetermined area of the memory, as is shown in FIG. 3, this information processing device performs the functions of at least a particle information extraction portion 241, a storage portion 242, a particle group characteristic calculation portion 243, a calculation command portion 244, and a display control portion 245.

The particle information extraction portion 241 receives the acquisition image data output from the image acquisition portion 23, and performs processing in sequence on the acquisition images shown by this acquisition image data so as to extract therefrom particle information in the form of information pertaining to the particles captured in the acquisition images. More specifically, this particle information extraction portion 241 performs image processing such as, for example, smoothing, noise removal, cropping, circle separation, line thinning, binarization, enhancement and/or edge detection, and the like on the acquisition images shown by the acquisition image data, and then extracts the particle information pertaining to the respective particles appearing within the acquisition image (more specifically, pertaining to particles that appear in focus within a predetermined depth of field). The term 'particle information' refers to physical property values of each of the particles making up the particle group and may refer to, without being limited thereto, for example, a particle diameter (i.e., a diameter corresponding to an area circle thereof), an aspect ratio, a long axis length, a short axis length, a maximum distance, a circumference, an area (as actually measured in μm 2), an area (in pixels: i.e., the number of pixels in a particle), roundness, convex flatness, and an intensity of the acquired pixels and the like.

When the particle information extraction portion 241 receives the acquisition image data, it immediately processes the relevant acquisition images and extracts each item of particle information. Particle data showing the particle information for each particle extracted from a single acquisition image is stored as a single particle data group in the storage portion 242 that has been set in a predetermined area of the memory. Each time the particle information extraction portion 241 receives acquisition image data, the new particle data group that is obtained when this data is processed and extracted is differentiated from the other particle data groups stored up till that point and is stored in the storage portion 242.

Figure 4:
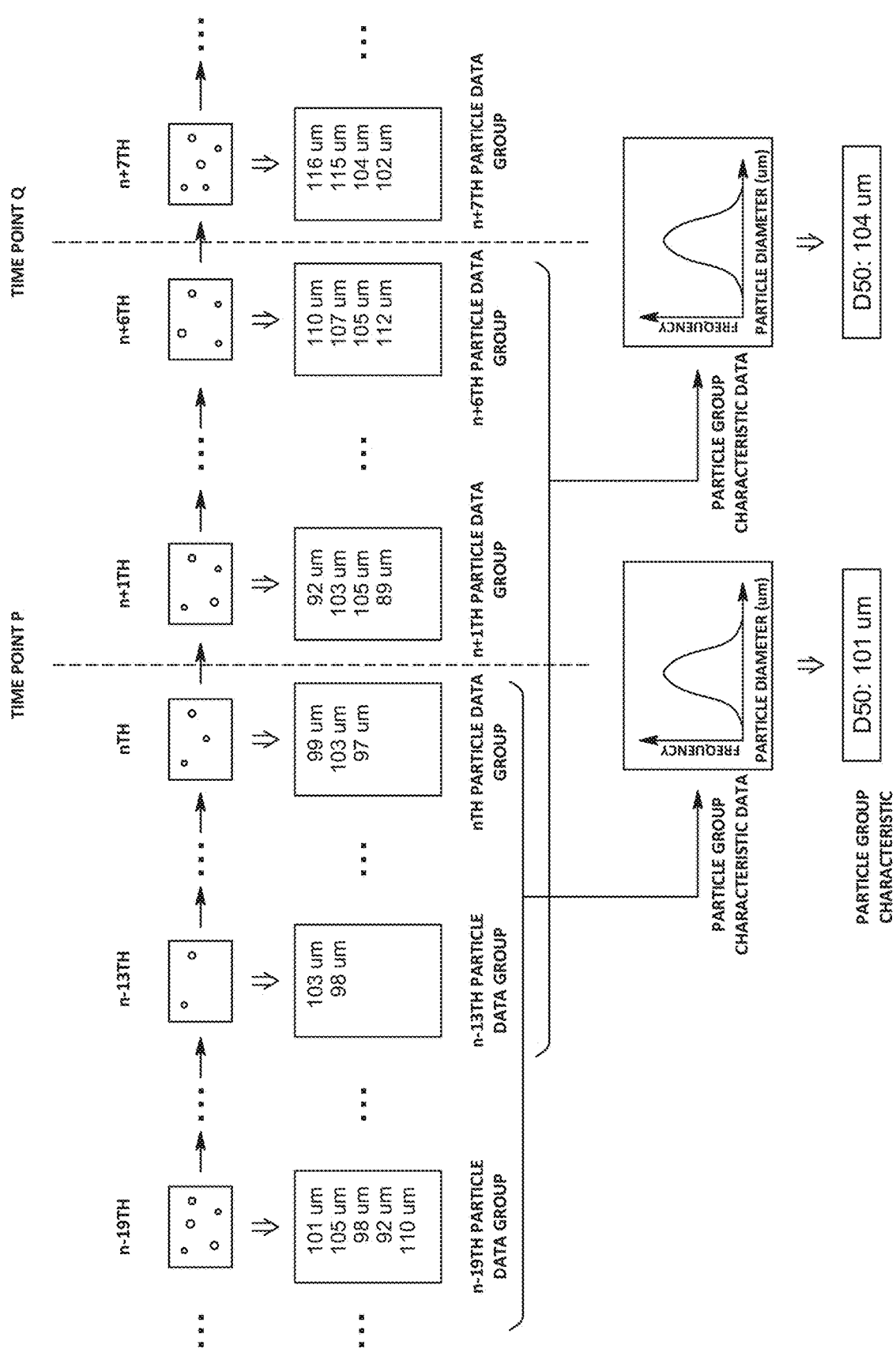
FIG. 4 is a view illustrating a flow of a particle group characteristic calculation performed by the particle group characteristic measurement device of the same embodiment.

For example, as is shown in FIG. 4, in a case in which three particles appear in an $n^{th}$ acquisition image received from the image acquisition portion 23, the particle information extraction portion 241 extracts the respective particle diameters of these three particles from the acquisition image as particle information. Particle data pertaining to the three extracted particle diameters is then stored as an $n^{th}$ particle data group in the storage portion 242.

The particle information extraction portion 241 is formed in such a way that, when it has finished extracting the particle information from a single received acquisition image, it immediately outputs an image acquisition command signal to the image acquisition portion 23. Note that the particle information extraction portion 241 of the present embodiment is formed in such a way that, when it has finished extracting the particle information from an acquisition image, it deletes the acquisition image data showing this acquisition image without storing it in the storage portion 242. As a consequence, the volume of data stored in the storage portion 242 can be reduced.

The storage portion 242 is formed in such a way that it stores a predetermined upper limit number of particle data groups. In a case in which the number of information data groups being stored reaches the upper limit, then when the storage portion 242 receives a new particle data group, it deletes in sequence the next oldest particle data group currently being stored.

The particle group characteristic calculation portion 243 calculates a particle group characteristic at a plurality of time points in a time series based on the particle information extracted from the plurality of acquisition images acquired respectively prior to each of those time points. More specifically, the particle group characteristic calculation portion 243 is formed in such a way that it refers to the particle data groups stored in the storage portion 242 and, based on the particle information contained in the plurality of particle data groups extracted prior to each time point, calculates the particle group characteristic at each time point. The term 'particle group characteristic' refers to a representative value for the particle information of each individual particle making up the particle group. For example, in a case in which the 'particle diameter' is used as the particle information, the particle group characteristic is the 'representative particle diameter ($D_{10}$, $D_{50}$, $D_{90}$ and the like)'.

In this way, the particle group characteristic calculation portion 243 of the present embodiment calculates the particle group characteristic at each time point based on the particle information contained in a plurality of particle data groups that partially overlap with the plurality of particle data groups used in the calculation of the particle group characteristic at least at the immediately previous time point. In other words, the particle group characteristic calculation portion 243 is formed in such a way that it calculates the particle group characteristic at a particular time point while taking into consideration the particle information used for the calculation of the particle group characteristic at the time point previous to that particular time point.

The particle group characteristic calculation portion 243 calculates the particle group characteristic at each time point based on a plurality of particle data groups including at least the particle data group that was most recently extracted at the immediately previous time point, and any particle data groups whose extraction sequence is newer than this. More specifically, the particle group characteristic calculation portion 243 calculates the particle group characteristic at each time point based on particle information contained in a plurality of particle data groups that include the most recently extracted particle data group. Furthermore, the particle group characteristic calculation portion 243 also calculates the particle group characteristic at each time point based on particle information contained in a fixed number of particle data groups that were extracted in a continuous sequence. Here, the number of particle data groups referred to at each time point can be set to a number desired by a user.

For example, in a case in which the number of particle data groups referred to at each time point is set to 20, then as is shown in FIG. 4, the particle group characteristic calculation portion 243 calculates the particle group characteristic at a particular time point P based on 20 particle data groups that extend in a continuous sequence from the $n^{th}$ particle group information data, which was extracted most recently, back to the $n-19^{th}$ particle data group. In addition, the particle group characteristic calculation portion 243 calculates the particle group characteristic at the next time point Q based on 20 particle data groups that extend in a continuous sequence from the $n+6^{th}$ particle group information data, which was extracted most recently, back to the $n-13^{th}$ particle data group.

More specifically, as is shown in FIG. 4, each time the particle group characteristic calculation portion 243 calculates the particle group characteristic at each time point, it calculates a histogram (in which a horizontal axis shows rank, and a vertical axis shows frequency) which is based on the plurality of particle information items contained in a plurality of particle data groups, and then calculates the particle group characteristic based on this histogram. It is also possible for the particle group characteristic calculation portion 243 to be formed so as to calculate, at each time point, a plurality of particle group characteristics that are mutually different from each other. It is also possible for the particle group characteristic calculation portion 243 to calculate, at each time point, a plurality of particle group characteristics of the same type such as, for example, the representative particle diameters $D_{10}$, $D_{50}$, and $D_{90}$ and the like, or to calculate mutually different types of particle group characteristics such as the particle diameter, aspect ratio, and roundness and the like.

When the particle group characteristic calculation portion 243 has calculated the particle group characteristic at each time point, it immediately outputs particle group characteristic data that shows this. In addition to this, it is also possible for the particle group characteristic calculation portion 243 to output histogram data showing a histogram that has been calculated for this particle group characteristic.

The calculation command portion 244 outputs to the particle group calculation portion 243 a calculation command signal commanding that the particle group characteristic be calculated. The calculation command portion 244 of the present embodiment is formed so as to measure time based on a signal from a clock built into the second information processing device 24, and to then output a calculation command signal at predetermined timings. The timings when the calculation command portion 244 outputs a calculation command signal may be regular fixed time intervals (for example, at 1 second intervals), or may be at predetermined times. When the particle group characteristic calculation portion 243 receives a calculation command signal, it reads the particle data from the storage portion 242, and calculates the particle group characteristic.

The display control portion 245 receives the particle group characteristic data and displays this as the calculation result on the display device 25. More specifically, the display control portion 245 displays on the display device 25 a graph in which a horizontal axis shows time, and a vertical axis shows the particle group characteristic. The particle group characteristics at each time point as calculated by the particle group characteristic calculation portion 243 are plotted in sequence on this graph. Here, the position on the horizontal axis of each plot shows the time when the particle group characteristic was calculated, and is based on the internal clock built into the second information processing device 24. More specifically, this time is the time when the clock output a calculation command signal. Note that, in a case in which there are a plurality of types of particle group characteristics calculated by the particle group characteristic calculation portion 243, it is also possible for the display control portion 245 to plot this plurality of types of particle group characteristics on the same graph. In a case in which the value indicated by the particle group characteristic at the newest time point being displayed is within a predetermined range (for example, in a case in which the representative diameter D50 exceeds a predetermined threshold value $D_{th}$), then the display control portion 245 displays a message on the display device 25 to the effect that the measurement of the particle diameter distribution may now be started.

Moreover, it is also possible for the display control portion 245 to receive histogram data and display this as a calculation result on the display device 25.

Figure 5:
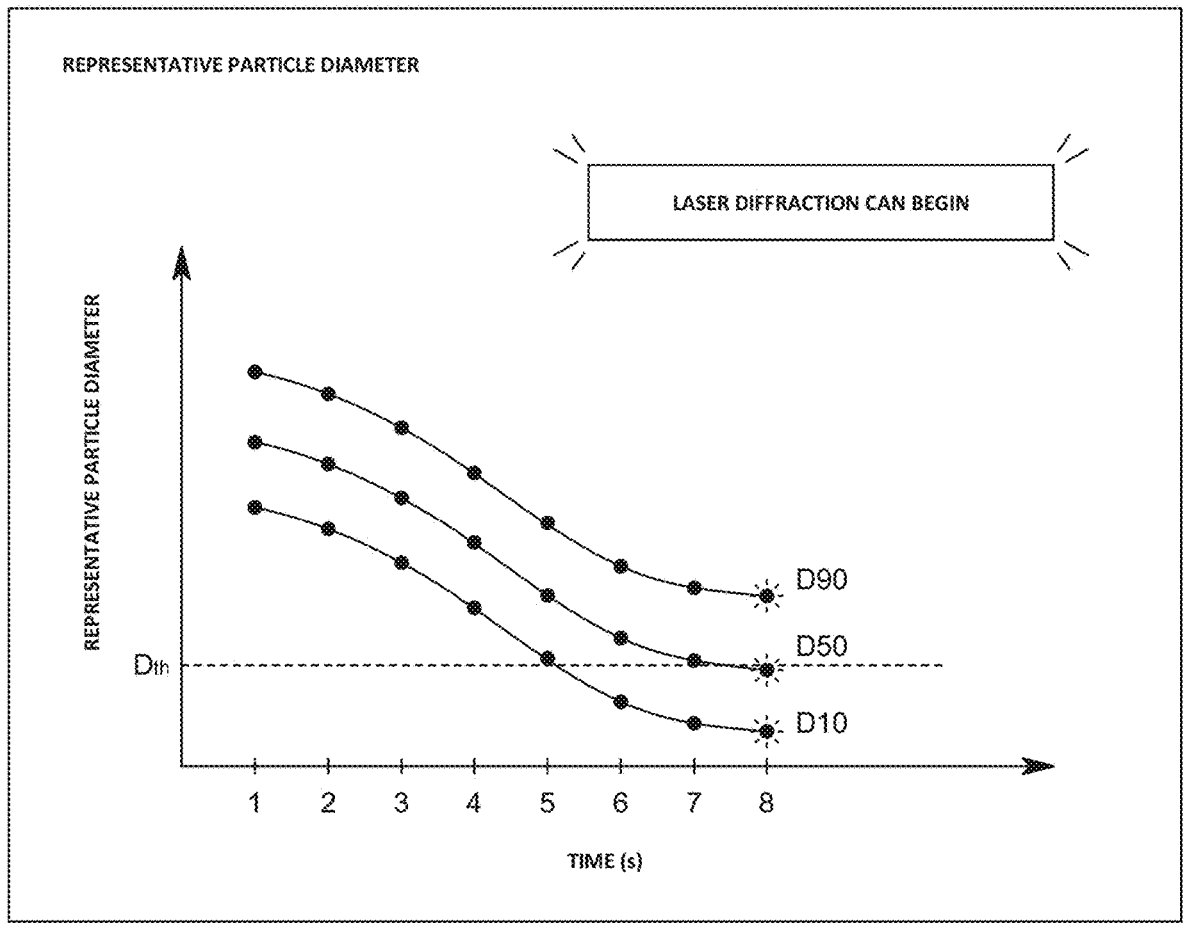
FIG. 5 is a screen view showing an example of a portion of a display screen of a display device of the same embodiment.
Figure 6:
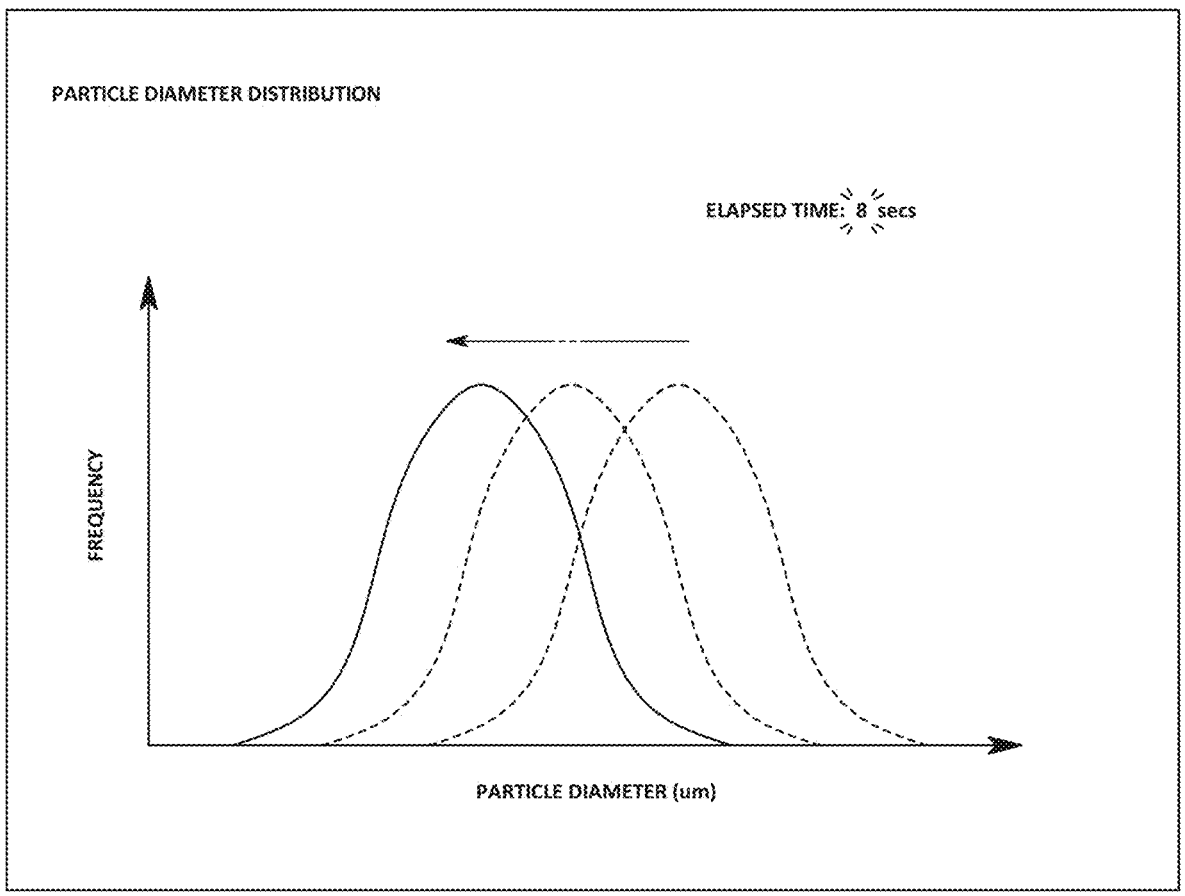
FIG. 6 is a screen view showing an example of a portion of a display screen of the display device of the same embodiment.

Examples of screens displayed on the display device 25 are shown in FIG. 5 and FIG. 6. As is shown in FIG. 5, a particle group characteristic change graph that shows changes over time in particle group characteristics (here, these characteristics are the representative particle diameters $D_{10}$, $D_{50}$, and $D_{90}$) is displayed on the display device 25. The most recent values are plotted at fixed time intervals (here, the time interval is every 1 second) on this particle group characteristic graph. As is shown in FIG. 5, when the value of a predetermined particle group characteristic (in this case, $D_{50}$) falls below the set threshold value $D_{th}$, a message prompting the user to execute laser diffraction is displayed. In addition, as is shown in FIG. 6, a histogram (i.e., a particle diameter distribution in which a horizontal axis shows the particle diameter, and a vertical axis shows the frequency) calculated from the particle information extracted from the most recent plurality of consecutive acquisition images at each time point is also displayed in real time on the display device 25. This histogram is updated to the most recent state at fixed time intervals (here, the time interval is every 1 second). The screens shown in FIG. 5 and FIG. 6 may be mutually separate screens, or may be combined on the same screen.

Figure 7:
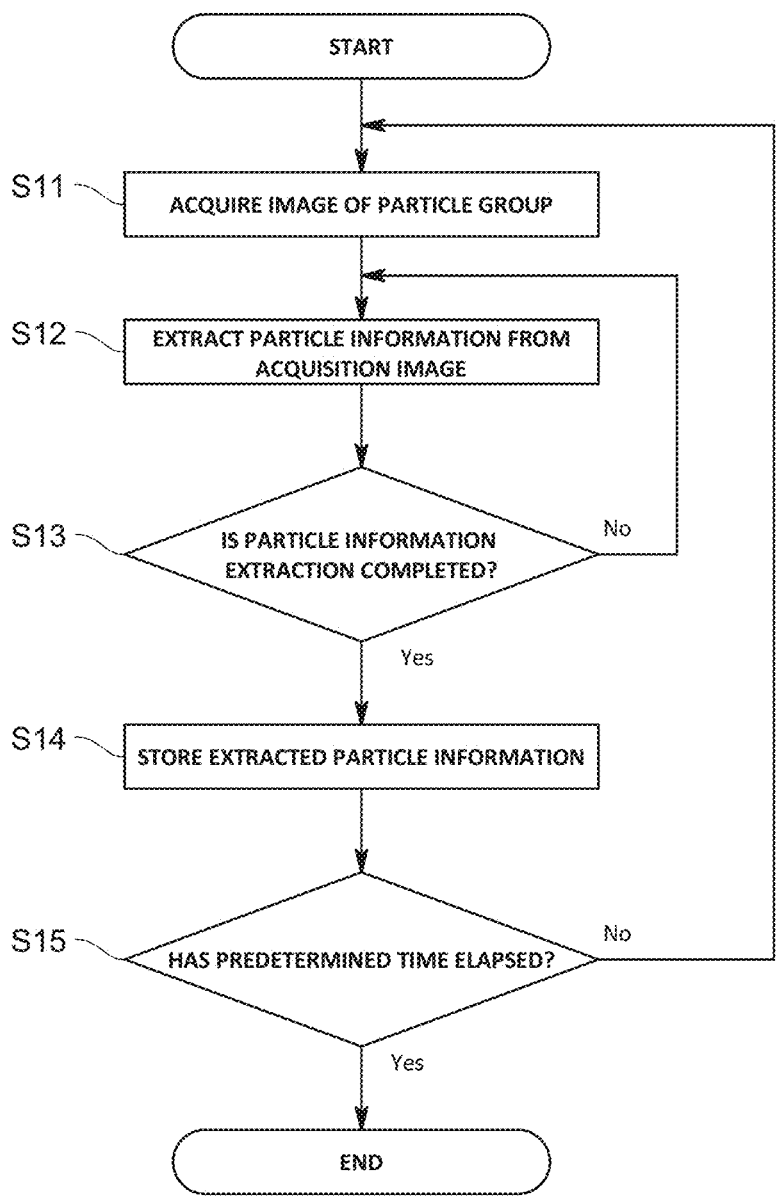
FIG. 7 is a flowchart showing a particle information extraction operation performed by the particle diameter distribution measurement device of the same embodiment.
Figure 8:
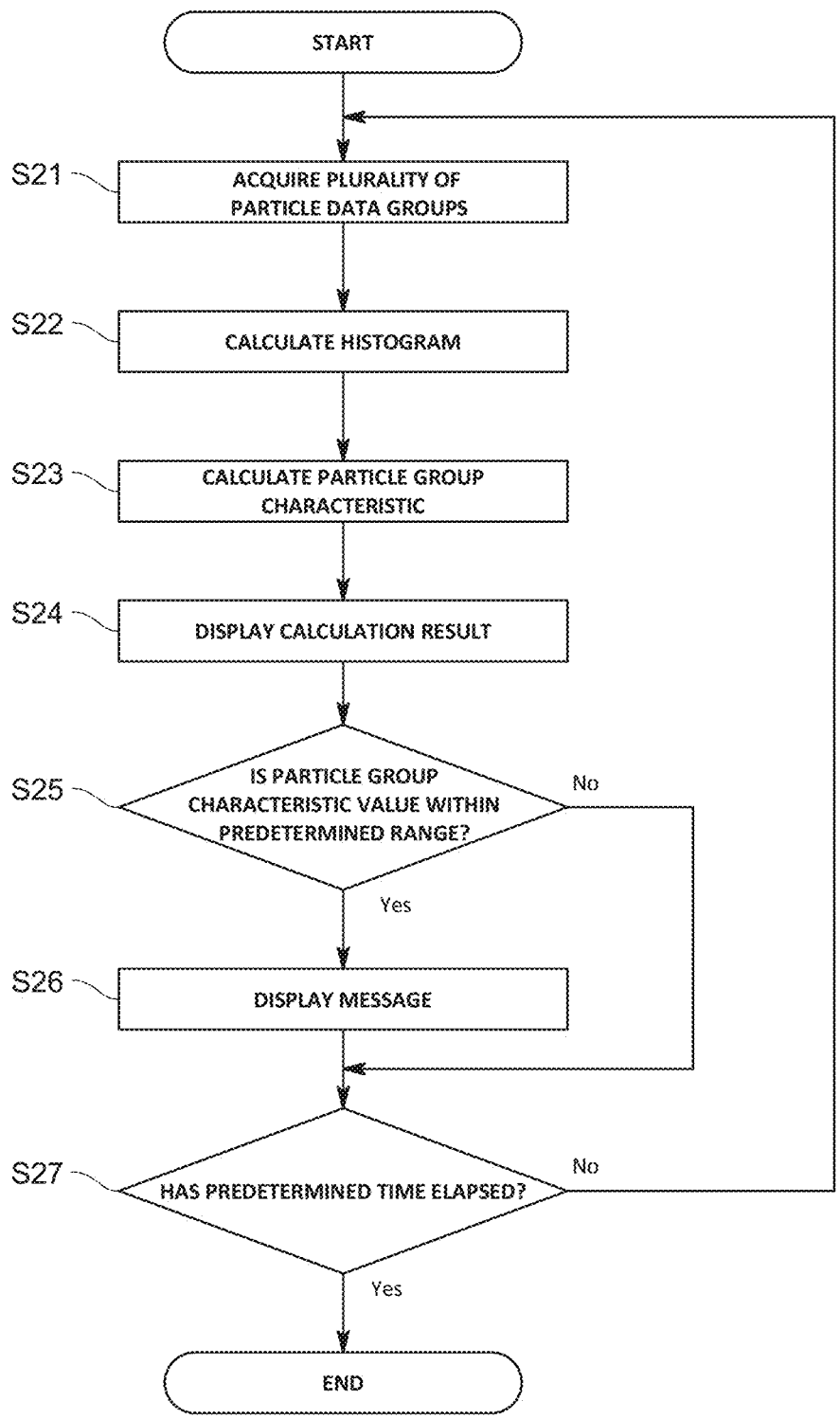
FIG. 8 is a flowchart showing a particle group characteristic calculation operation performed by the particle diameter distribution measurement device of the same embodiment.

Next, an operation of the particle group characteristic measurement device 200 having the above-described structure will be described with reference to the flowchart shown in FIG. 7.

(Particle Information Extraction Operation)

An operation to extract particle information from a suspension will now be described. This operation is begun in the particle diameter distribution measurement device 100 after a powder sample has been loaded into the sample loading tank 11 and mixed into the dispersion medium, and after the circulation of the resulting suspension in the circulation system 11 has commenced.

Firstly, light is irradiated from the image capture light source 22 onto the suspension flowing through the interior of the image capture cell 21. An image of a particle group in the suspension flowing through the image capture cell 21 is then acquired by the image acquisition portion 23 (step S11), and the resulting image acquisition data is then immediately output to the second information processing device 24. The output acquisition image is then processed by the particle information extraction portion 241, and information pertaining to each of the particles (i.e., particle information) appearing in the acquisition image is extracted (step S12). When the extraction of the particle information from the acquisition image is completed (step S13), either one item or a plurality of items of the extracted particle information is then stored in the storage portion 242 as a particle data group (step S14). Once a predetermined time has elapsed from the start of the operation (step S15), the actions of step S11 through step S14 are repeated.

(Particle Characteristic Calculation Operation)

A description will now be given of an operation to calculate a particle group characteristic of a particle group based on particle information extracted via the particle information extraction operation. This operation is begun after the particle information extraction operation has commenced, and is performed in parallel with the particle information extraction operation. In the particle group characteristic calculation operation, a particle group characteristic is calculated at predetermined fixed time intervals.

At a predetermined timing, by referring to the storage portion 242, a predetermined plurality of consecutive particle data groups in sequence from the most recently extracted particle data group are acquired (step S21), and a histogram is calculated based on the particle information contained in the plurality of particle data groups (step S22). A particle group characteristic is then calculated based on this calculated histogram (step S23). A value of this calculated particle group characteristic is then plotted on a graph on the display device 25 (step S24). In a case in which the value of the calculated particle group characteristic is within a predetermined range (for example, is equal to or greater than a predetermined threshold value) (step S25), a message to the effect that laser diffraction may be performed in the particle diameter distribution measurement device 100 is displayed on the display device 25 (step S26). In a case in which a predetermined time has not elapsed since the commencement of the operation (step S27), a predetermined plurality of consecutive particle data groups in sequence from the most recently extracted particle data group are acquired at the next predetermined timing (step S21). Here, the particle group characteristic calculation portion 243 acquires the particle data group in such a way that a portion thereof overlaps with the particle data group acquired at the immediately previous timing. The operations of step S21 through step S26 are then repeated until a predetermined time has elapsed since the commencement of the operation (step S27).

According to the particle group characteristic measurement device 200 of the present embodiment which is formed in the above-described manner, because a particle group characteristic at each time point is calculated based on the particle information extracted from a consecutive plurality of acquisition images that include the most recent acquisition image, compared with a case in which a particle group characteristic is calculated based on particle information extracted from a single acquisition image, the quantity of statistical particle information can be increased, and the number of statistical errors contained in the calculated particle group characteristic can be reduced. Moreover, because a portion of the plurality of acquisition images used to calculate a particle group characteristic at each time point is made up of acquisition images that have already been obtained up until the time point prior to that time point, it is possible to shorten the time required to secure the number of particle information items that are needed in order to reduce statistical errors to within a permissible range, and it is also possible to calculate the particle group characteristic at each time point within a short space of time. As a consequence, at the same time as statistical errors contained in a calculated particle group characteristic are reduced, it becomes easier to ascertain changes over time in the particle group characteristic.

In addition, in the particle diameter distribution measurement device 100 of the present embodiment, because changes over time in a characteristic of a particle group in a suspension flowing through the circulation system 11 are monitored using the above-described particle group characteristic measurement device 200, for example, at the same time as a user is observing particle dispersion deficiencies or the like, that user is able to start measuring a particle diameter distribution using the optical measurement system 12 at an appropriate timing.

Additional Variant Embodiments

Note that the present invention is not limited to the above-described embodiment.

Figure 9:
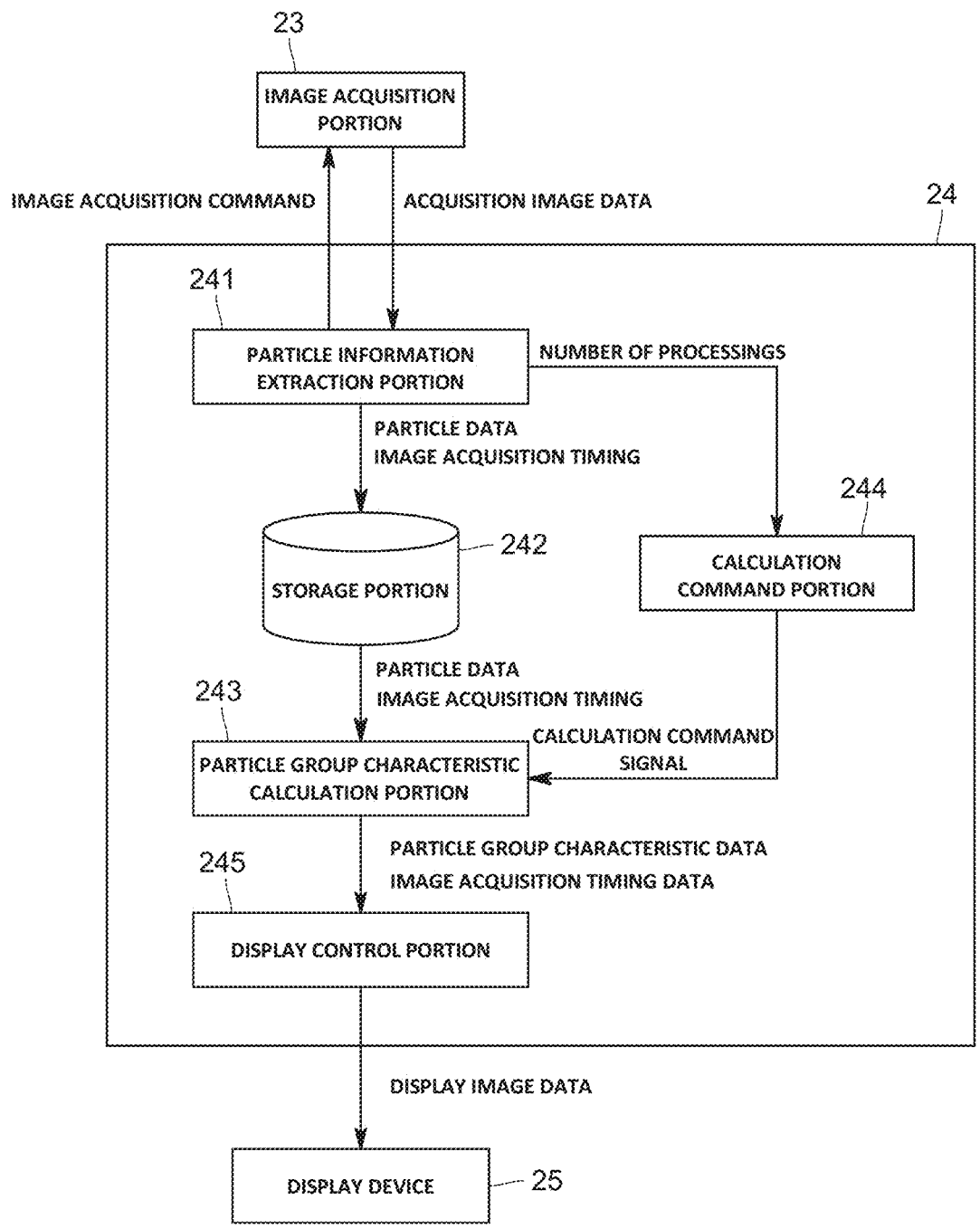
FIG. 9 is a function block diagram of a particle group characteristic measurement device of another embodiment.

In the above-described embodiment a structure is employed in which the calculation command portion 244 measures time based on signals from a clock, and then outputs a calculation command signal at a predetermined timing, however, the present invention is not limited to this. As is shown in FIG. 9, it is also possible to employ a structure in which a calculation command portion 244 of another embodiment is formed so as to count the number of acquisition images processed by the particle information extraction portion 241, and each time the particle information extraction portion 241 extracts particle information from a predetermined number of acquisition images, this calculation command portion 244 outputs a calculation command signal to the particle group characteristic calculation portion 243.

In this case, it is preferable that the particle information extraction portion 241 process the acquisition image so as to extract the image acquisition timing when that image was acquired, and then link this image acquisition timing with the particle data group extracted from the acquisition image, and then store these together in the storage portion 242. When the particle group characteristic calculation portion 243 receives the calculation command signal, it calculates the particle group characteristic by referring to the predetermined number of particle data groups, and also refers to the plurality of image acquisition timings linked to the predetermined number of particle groups. The particle group characteristic calculation portion 243 then decides on one timing that is linked to the calculated particle group characteristic, and outputs this to the display control portion 245 as image acquisition timing data. Here, the timing indicated by the image acquisition timing data may either be any one of the plurality of image acquisition timings referred to, or may be a timing indicating how much time has elapsed from a predetermined reference timing calculated on the basis of the plurality of image acquisition timings that were referred to.

The particle information extraction portion 241 of the above-described embodiment calculates the particle group characteristic at each time point based on the particle information contained in the plurality of particle data groups that partially overlap with the plurality of particle data groups used in the calculation of the particle group characteristic at the immediately previous time point, however, the present invention is not limited to this. It is also possible for the particle information extraction portion 241 to calculate the particle group characteristic at each time point based on the plurality of acquisition images used to calculate the particle group characteristic at previous time points, and on the particle information extracted from a plurality of acquisition images whose image acquisition time bands partially overlap each other.

The image capture cell 21 of the above-described embodiment is a flow-type of cell, however, the present invention is not limited to this, and it is also possible for a batch-type of cell to be used instead. In a case in which a batch-type of image capture cell 21 is used, it becomes possible to ascertain changes over time in a particle group characteristic that are caused by a change in the temperature of the dispersion medium.

The particle group characteristic calculation portion 243 of the above-described embodiment calculates the particle group characteristic at each time point based on the particle information contained in the most recently extracted particle data group, however, the present invention is not limited to this. In another embodiment, it is also possible for the particle group characteristic to be calculated based on the particle information contained in the plurality of particle data groups excluding the most recently extracted particle data group.

The particle group characteristic calculation portion 243 of the above-described embodiment calculates the particle group characteristic at each time point based on the particle information contained in a plurality of particle data groups that were extracted in a continuous extraction sequence, however, the present invention is not limited to this. In another embodiment, it is also possible for the particle group characteristic to be calculated based on the particle information contained in a plurality of particle data groups that were extracted in a non-continuous extraction sequence.

The particle group characteristic measurement device 200 of the above-described embodiment forms part of the particle diameter distribution measurement device 100, however, the present invention is not limited to this. It is, of course, also possible for the particle group characteristic measurement device 200 to be used independently of another device.

In the above-described embodiment, the functions of the particle diameter distribution calculation portion 123a are performed by a separate computer from that used to perform the functions of the particle information extraction portion 241, the storage portion 242, the particle group characteristic calculation portion 243, and the display control portion 244, however, the present invention is not limited to this. In another embodiment, it is also possible for each of these functions to be performed by the same computer.

In the above-described embodiment, the functions of the particle information extraction portion 241, the storage portion 242, the particle group characteristic calculation portion 243, and the display control portion 244 are performed by a single computer, however, the present invention is not limited to this. In another embodiment, it is also possible for these functions to be performed individually by a plurality of computers.

In the above-described embodiment, the particle information extraction operation and the particle group characteristic calculation operation are ended as a result of a predetermined length of time having elapsed since these operations were started, however, the present invention is not limited to this. In another embodiment, it is also possible for the particle information extraction operation to be ended once particle information has been extracted from a predetermined number of acquisition images. The particle group characteristic calculation operation may also be ended once the calculated value of the particle group characteristic either exceeds or falls below a predetermined value, or may be ended once the value of the particle group characteristic has been calculated a predetermined number of times. It is also possible for both the particle information extraction operation and the particle group characteristic calculation operation to be ended as a result of a user pressing an END button.

In addition to these, the present invention is not limited to the above-described embodiments and it should be understood that various modifications and the like may be made thereto insofar as they do not depart from the spirit or scope of the present invention.

INDUSTRIAL APPLICABILITY

According to the present invention, it is possible to provide a particle group characteristic measurement device that measures changes over time in a particle group characteristic based on acquisition images of the particle group, and it thereby is possible to not only reduce statistical errors contained in a particle group characteristic that is being calculated, but to also easily ascertain any changes over time in that characteristic.

What is claimed is:

1. A particle group characteristic measurement device that measures changes over time in a particle group characteristic which is a characteristic of a particle group that is formed by a plurality of particles dispersed in a dispersion medium, comprising:
   an image acquisition portion that includes image acquisition elements and acquires consecutive acquisition images of the particle group, each of the consecutive acquisition images being acquired using the image acquisition elements;
   a particle information extraction portion that processes the consecutive acquisition images acquired by the image acquisition portion, and then extracts particle information which is information about the particles appearing in the consecutive acquisition images;
   a particle group characteristic calculation portion that calculates the particle group characteristic at a plurality of time points in a time series based on the particle information extracted from a plurality of the consecutive acquisition images acquired prior to the respective time points, the particle group characteristic being a representative particle diameter of a plurality of particles forming the particle group; and
   a display control portion that displays a graph showing changes over time in the representative particle diameter calculated by the particle group characteristic calculation portion at each of the plurality of time points, wherein a portion of the plurality of the consecutive acquisition images used to calculate the particle group characteristic at one time point of the plurality of time points overlaps in image acquisition time period with a portion of the plurality of the consecutive acquisition images used to calculate the particle group characteristic at an earlier time point of the plurality of time points.

2. The particle group characteristic measurement device according to claim 1, wherein the plurality of the consecutive acquisition images used to calculate the particle group characteristics at the one time point partially overlaps with the plurality of the consecutive acquisition images used to calculate the particle group characteristic at the earlier time point immediately previous to the one time point.

3. The particle group characteristic measurement device according to claim 1, wherein the particle group characteristic calculation portion calculates the particle group characteristic at the one time point based on a plurality of the particle information items that include the particle information extracted from the acquisition image immediately previous to the one time point.

4. The particle group characteristic measurement device according to claim 1, wherein the particle group characteristic calculation portion calculates the particle group characteristic at each time point based on the particle information extracted from a fixed number of the consecutive acquisition images that were acquired in a continuous acquisition sequence.

5. The particle group characteristic measurement device according to claim 1, further comprising a calculation command portion that outputs a calculation command signal commanding that the particle group characteristic be calculated to the particle group characteristic calculation portion, wherein
the calculation command portion outputs the calculation command signal at predetermined time intervals.

6. The particle group characteristic measurement device according to claim 1, further comprising a calculation command portion that outputs a calculation command signal commanding that the particle group characteristic be calculated to the particle group characteristic calculation portion, wherein
the calculation command portion outputs the calculation command signal each time the particle information extraction portion extracts the particle information from a predetermined number of the consecutive acquisition images.

7. The particle group characteristic measurement device according to claim 1, wherein the display control portion displays in real time results of the calculation made by the particle group characteristic calculation portion at each of the time points.

8. The particle group characteristic measurement device according to claim 7, wherein the particle group characteristic calculation portion calculates a mutually different plurality of the particle group characteristics, and
the display control portion displays this plurality of particle group characteristics on the same screen.

9. A particle diameter distribution measurement device that measures a particle diameter distribution of a particle group that is formed by a plurality of particles dispersed in a dispersion medium, comprising:
a circulation system that causes a suspension to circulate between a measurement cell and a mixture tank that creates the suspension by mixing the dispersion medium with the particles;
an optical measurement system that measures the particle diameter distribution of the particle group based on scattered light that is generated as a result of laser light being irradiated onto the suspension that is flowing through an interior of the measurement cell; and
the particle group characteristic measurement device according to claim 1 that measures changes over time in a characteristic of the particle group in the suspension that is flowing through the circulation system.

10. The particle group characteristic measurement device according to claim 1, further comprising a storage, wherein
the particle information extracted from the plurality of the consecutive acquisition images is stored in the storage as particle data groups corresponding respectively to the plurality of the consecutive acquisition images,
the particle group characteristic calculation portion uses a fixed number of the particle data groups stored in the storage that were extracted in a continuous sequence for calculating the particle group characteristic for each of the time points, and
a portion of the particle data groups used for calculating the particle group characteristic at the one time point were used to calculate a previous particle group characteristic at the earlier time point.

11. A particle group characteristic measurement method which is a method of measuring changes over time in a particle group characteristic which is a characteristic of a particle group that is formed by a plurality of particles dispersed in a dispersion medium, comprising:
acquiring consecutive acquisition images of the particle group using image acquisition elements of an image acquisition portion;
processing the acquired consecutive acquisition images of the particle group, and extracting particle information which is information about the particles appearing in the consecutive acquisition images;
calculating the particle group characteristic at a plurality of time points in a time series based on the particle information extracted from the plurality of the consecutive acquisition images acquired prior to the respective time points, the particle group characteristic being a representative particle diameter of a plurality of particles forming the particle group; and
displaying a graph showing changes over time in the representative particle diameter calculated in the step of calculating at each of the plurality of time points, wherein,
in the calculation of the particle group characteristic, a portion of the plurality of the consecutive acquisition images used to calculate the particle group characteristic at one time point of the plurality of time points overlaps in image acquisition time period with a portion of the plurality of the consecutive acquisition images used to calculate the particle group characteristic at an earlier time point of the plurality of time points.

12. A particle diameter distribution measurement method which is a method of measuring a particle diameter distribution of a particle group that is formed by a plurality of particles dispersed in a dispersion medium, comprising:
causing a suspension to circulate between a measurement cell and a mixture tank that creates the suspension by mixing the dispersion medium with the particles;
measuring changes over time in a characteristic of the particle group in the suspension being circulated using the method according to claim 11; and measuring the particle diameter distribution of the particle group based on scattered light that is generated as a result of laser light being irradiated onto the suspension that is flowing through an interior of the measurement cell.

13. A storage medium that stores program for a particle group characteristic measurement device that measures changes over time in a particle group characteristic which is a characteristic of a particle group that is formed by a plurality of particles dispersed in a dispersion medium, the program being characterized by causing a computer to perform functions of:
- an image acquisition portion with image acquisition elements that acquires consecutive acquisition images of the particle group, each of the consecutive acquisition images being acquired using the image acquisition elements;
- a particle information extraction portion that processes the consecutive acquisition images acquired by the image acquisition portion, and then extracts particle information which is information about the particles appearing in the consecutive acquisition images;
- a particle group characteristic calculation portion that calculates the particle group characteristic at a plurality of time points in a time series based on the particle information extracted from a plurality of the consecutive acquisition images acquired prior to the respective time points, the particle group characteristic being a representative particle diameter of a plurality of particles forming the particle group; and
- a display control portion that displays a graph showing changes over time in the representative particle diameter calculated by the particle group characteristic calculation portion at each of the plurality of time points, wherein
- a portion of the plurality of the consecutive acquisition images used to calculate the particle group characteristic at one time point of the plurality of time points overlaps in image acquisition time period with a portion of the plurality of the consecutive acquisition images used to calculate the particle group characteristic at an earlier time point of the plurality of time points.

* * * * *